(12) United States Patent
Lin et al.

(10) Patent No.: US 11,289,837 B2
(45) Date of Patent: Mar. 29, 2022

(54) PLUG ASSEMBLY, ELECTRICAL CONNECTOR, CONNECTOR ASSEMBLY AND METHOD FOR MANUFACTURING PLUG ASSEMBLY

(71) Applicant: Tyco Electronics (Shanghai) Co. Ltd., Shanghai (CN)

(72) Inventors: WenZhang Lin, Shanghai (CN); Liang Huang, Chengdu (CN); Hong Lu, Shanghai (CN); Zhen Huang, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 72 days.

(21) Appl. No.: 16/744,532

(22) Filed: Jan. 16, 2020

(65) Prior Publication Data

US 2020/0227846 A1 Jul. 16, 2020

(30) Foreign Application Priority Data

Jan. 16, 2019 (CN) .......................... 201910042067.4

(51) Int. Cl.
| | |
|---|---|
| *H01R 12/71* | (2011.01) |
| *H01R 13/6585* | (2011.01) |
| *H01R 13/6471* | (2011.01) |
| *H01R 12/73* | (2011.01) |
| *H01R 13/04* | (2006.01) |
| *H01R 12/57* | (2011.01) |

(52) U.S. Cl.
CPC ........... *H01R 12/716* (2013.01); *H01R 12/57* (2013.01); *H01R 12/73* (2013.01); *H01R 13/04* (2013.01); *H01R 13/6471* (2013.01); *H01R 13/6585* (2013.01)

(58) Field of Classification Search
CPC ... B29L 2031/36; H01R 43/24; H01R 13/405; H01R 13/516
See application file for complete search history.

(56) References Cited

U.S. PATENT DOCUMENTS

| | | | | |
|---|---|---|---|---|
| 6,685,486 | B1* | 2/2004 | Zhang | H01R 13/6215 439/79 |
| 9,899,779 | B1* | 2/2018 | Lin | H01R 13/5202 |
| 2011/0300757 | A1* | 12/2011 | Regnier | H01R 43/20 439/626 |
| 2013/0122745 | A1* | 5/2013 | Soubh | H01R 12/716 439/607.09 |
| 2015/0372424 | A1* | 12/2015 | Little | H01R 13/642 439/217 |

(Continued)

OTHER PUBLICATIONS 2015-68729G, Sep. 2015, Derwent, Liu.*

*Primary Examiner* — Jean F Duverne

(74) *Attorney, Agent, or Firm* — Barley Snyder

(57) ABSTRACT

A plug assembly includes an insulating main body and a plurality of conductive terminals secured to the insulating main body by molding. The insulating main body has a mating portion adapted to mate with a receptacle assembly and a plurality of supporting through holes. Each of the conductive terminals has a contact portion with a contact surface. The contact surface is exposed from a sidewall of the mating portion. Each of the supporting through holes extends to a rear surface of one of the conductive terminals opposite to the contact surface from a rear side of the insulating main body.

20 Claims, 13 Drawing Sheets

(56) References Cited

U.S. PATENT DOCUMENTS

2017/0141495 A1* 5/2017 Cheng .................. H01R 13/405
2018/0109042 A1* 4/2018 Little ................... H01R 13/405
2019/0214755 A1* 7/2019 Manickam ........... H01R 12/721

* cited by examiner

PLUG ASSEMBLY, ELECTRICAL CONNECTOR, CONNECTOR ASSEMBLY AND METHOD FOR MANUFACTURING PLUG ASSEMBLY

CROSS-REFERENCE TO RELATED APPLICATION

This application claims the benefit of the filing date under 35 U.S.C. § 119(a)-(d) of Chinese Patent Application No. 201910042067.4, filed on Jan. 16, 2019.

FIELD OF THE INVENTION

The present invention relates to an electrical connector and, more particularly, to an electrical connector having a plug assembly.

BACKGROUND

Existing communication systems use electrical connectors to transmit data. In communication systems such as network systems, servers, data centers and the like, a plurality of electrical connectors are used to interconnect various devices of the communication system. For example, in a board-to-board (abbreviated as BTB) connector, in which a plug connector and a receptacle connector are mounted on two circuit boards respectively, intercommunication between the two circuit boards is realized by the mating of the plug connector with the receptacle connector.

One type of plug connector in the related art includes a housing and a plug assembly mounted in the housing. The plug assembly includes an insulating main body and a plurality of conductive terminals, such as eighty conductive terminals, mounted on the insulating main body. For such a large number of conductive terminals, it is difficult to accurately position the conductive terminals on the insulating main body during the manufacturing process.

SUMMARY

A plug assembly includes an insulating main body and a plurality of conductive terminals secured to the insulating main body by molding. The insulating main body has a mating portion adapted to mate with a receptacle assembly and a plurality of supporting through holes. Each of the conductive terminals has a contact portion with a contact surface. The contact surface is exposed from a sidewall of the mating portion. Each of the supporting through holes extends to a rear surface of one of the conductive terminals opposite to the contact surface from a rear side of the insulating main body.

BRIEF DESCRIPTION OF THE DRAWINGS

The invention will now be described by way of example with reference to the accompanying Figures, of which.

DETAILED DESCRIPTION OF EMBODIMENT(S)

Figure 1:
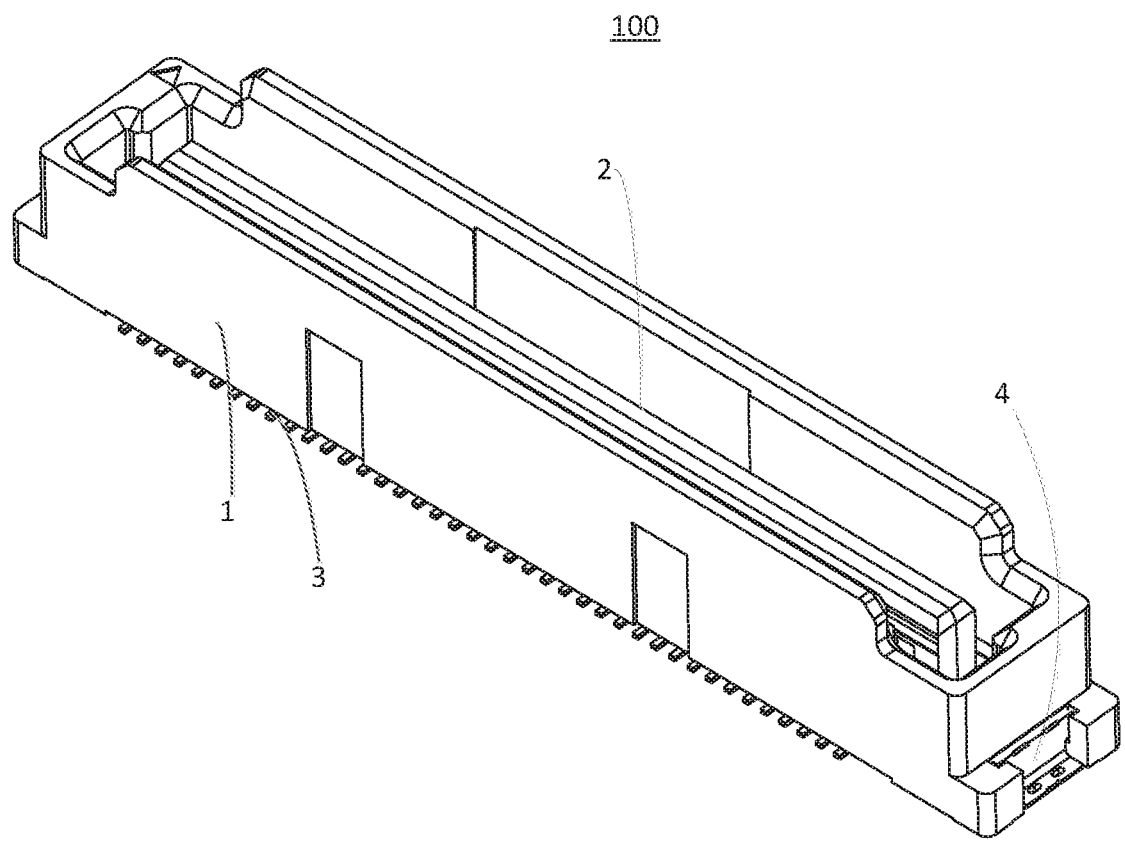
FIG. 1 is a perspective view of an electrical connector according to an embodiment.

The technical scheme of the present disclosure is further described in detail by the following embodiments with reference to the accompanying drawings. In the specification, the same or similar reference numerals denote the same or similar components. The following description of the embodiments of the present disclosure with reference to the accompanying drawings is intended to explain the general inventive concept of the present disclosure and should not be construed as a limitation of the present disclosure.

In addition, in the following detailed description, for purposes of explanation, numerous specific details are set forth in order to provide a thorough understanding of the embodiments of the present disclosure. However, it may be evident, that one or more embodiments may be practiced without these specific details. In other instances, well-known structures and devices are shown in schematic form in order to simplify the drawing.

Figure 13:
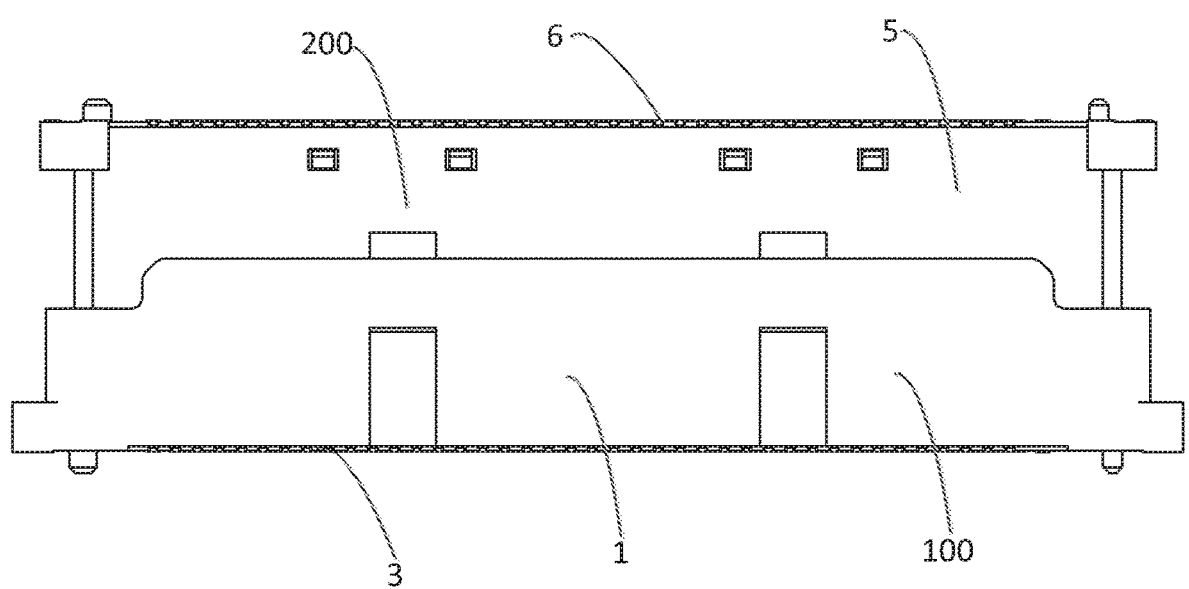
FIG. 13 is a side view of a connector assembly according to an embodiment.

A connector assembly according to an embodiment, as shown in FIG. 13, includes an electrical connector 100 and a mating connector 200 mating with the electrical connector 100. The electrical connector 100 is electrically connected to a circuit board and the mating connector 200 is electrically connected to a mating circuit board, so that the connector assembly according to the embodiments of the present disclosure may be used as a Board To Board (BTB) connector. Such board-to-board connector may be applied in communication systems, such as network systems, servers, data centers, etc., to achieve high speed transmission of data signals.

Figure 2:
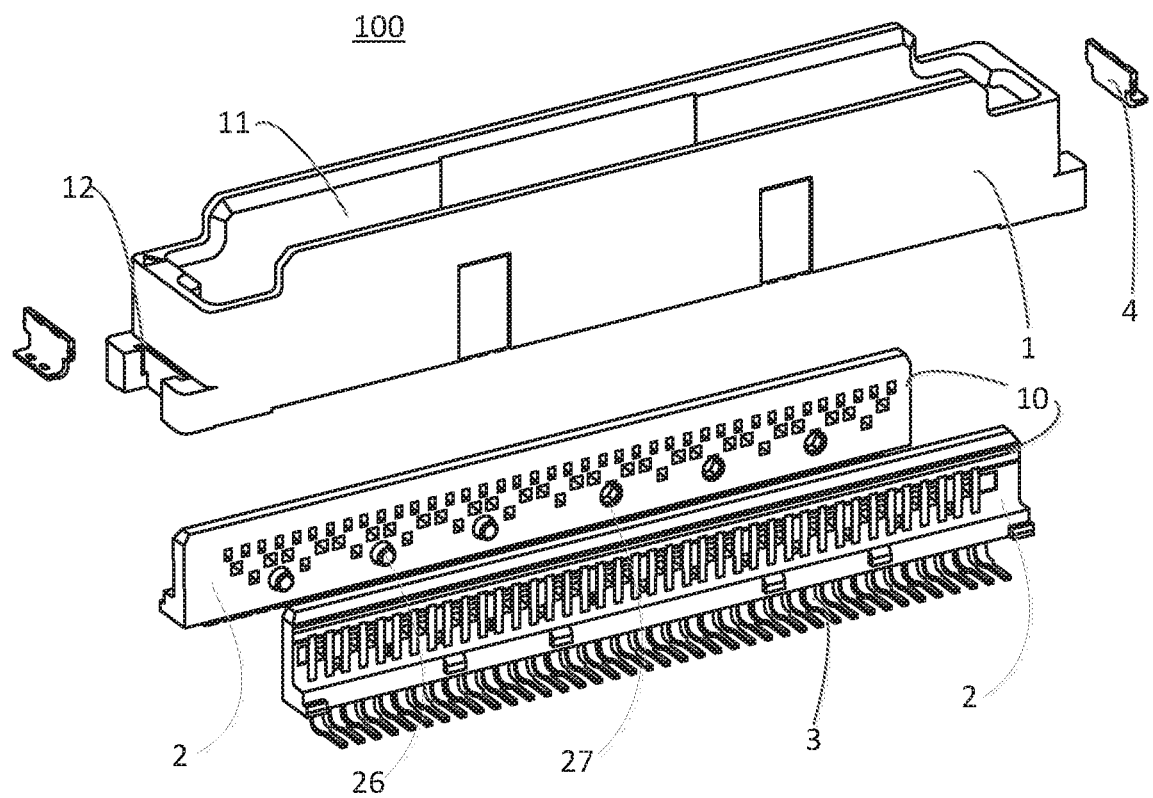
FIG. 2 is an exploded perspective view of the electrical connector of FIG. 1.

The electrical connector 100, as shown in FIGS. 1 and 2, includes a pair of plug assemblies 10 which are assembled together and a housing 1 made of insulating material. The plug assemblies 10 are mounted in a receiving chamber 11 of the housing 1.

Figure 3:
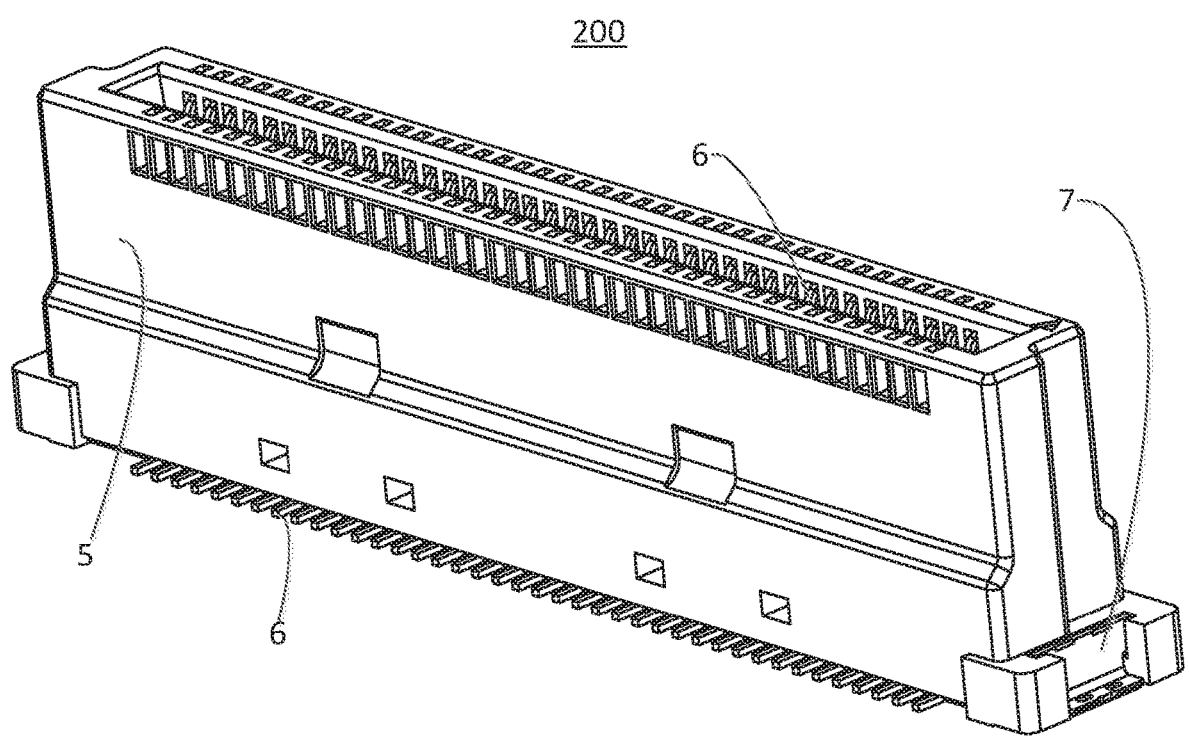
FIG. 3 is a perspective view of a mating connector according to an embodiment.
Figure 4:
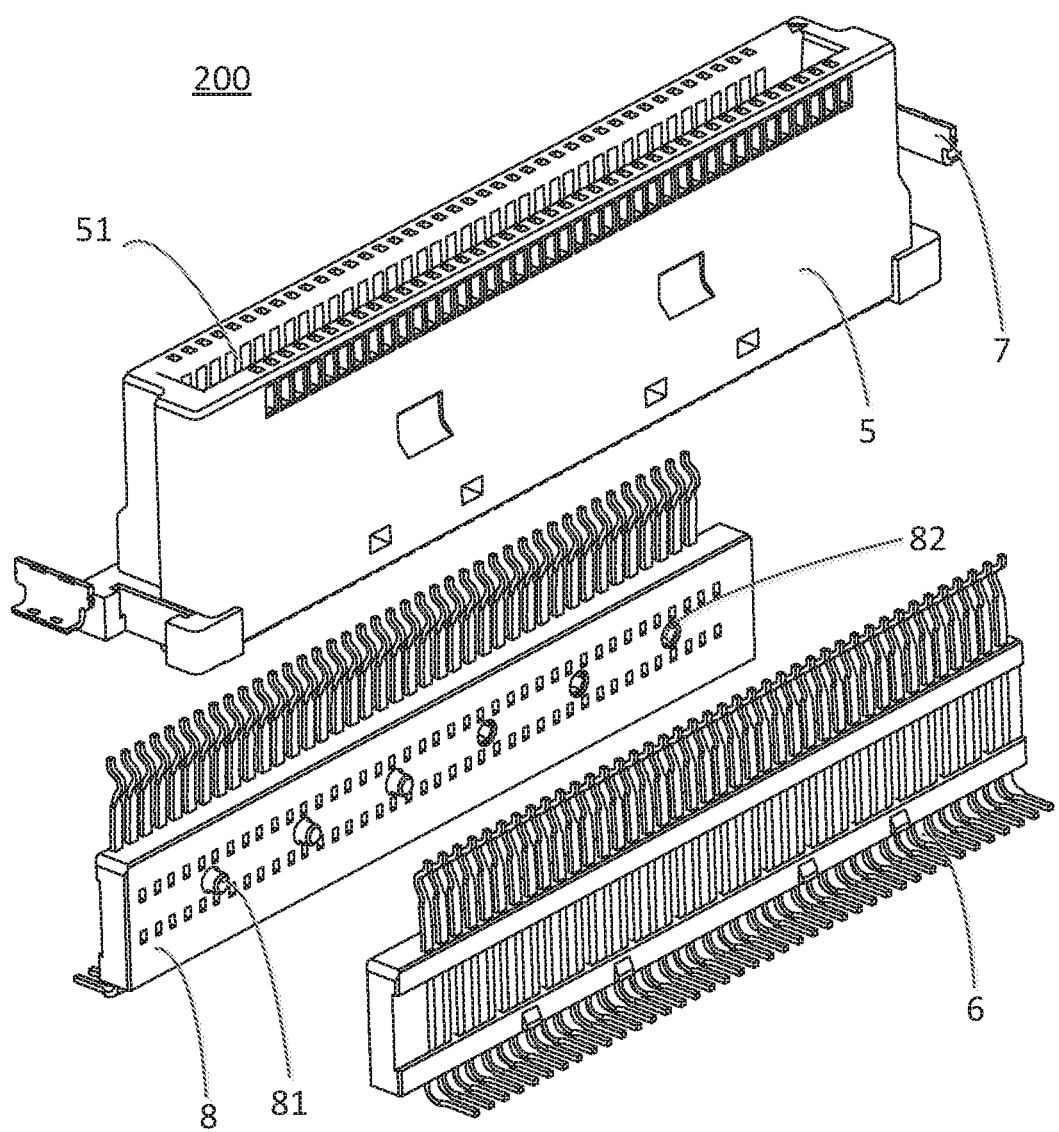
FIG. 4 is an exploded perspective view of the mating connector of FIG. 3.
Figure 5:
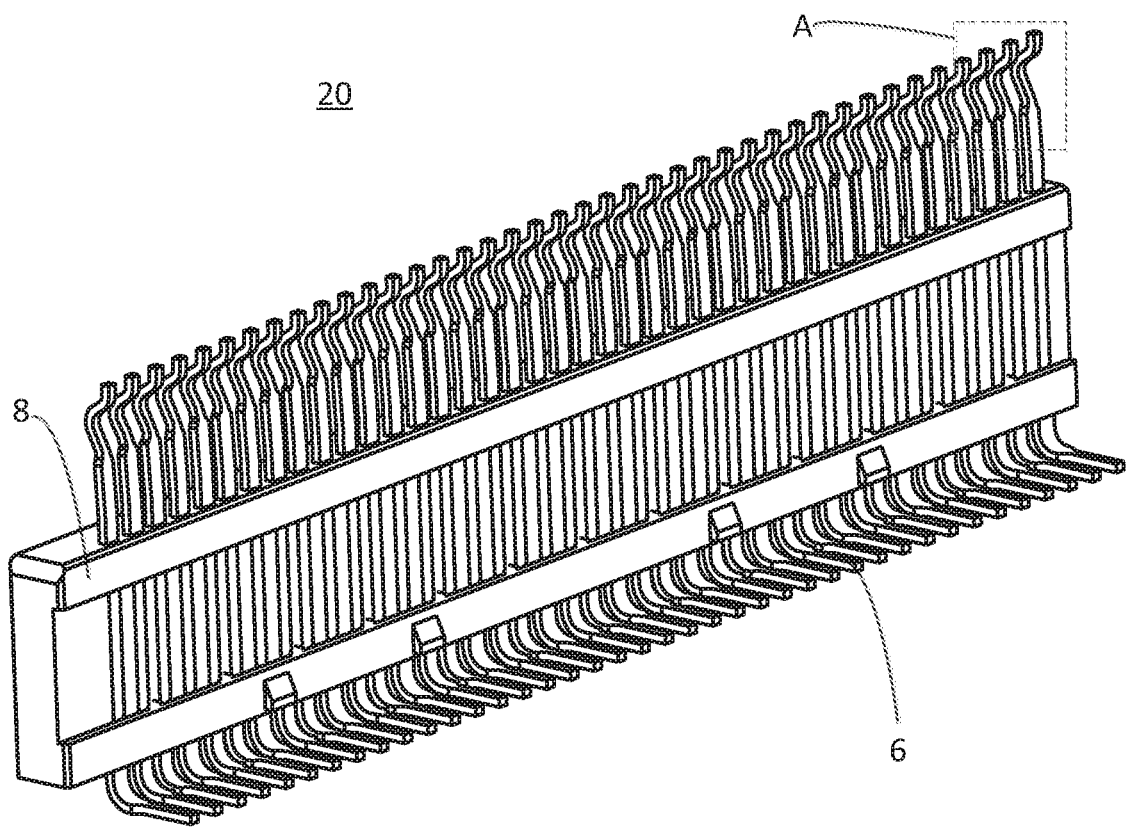
FIG. 5 is a perspective view of a receptacle assembly of the mating connector of FIG. 3.
Figure 6:
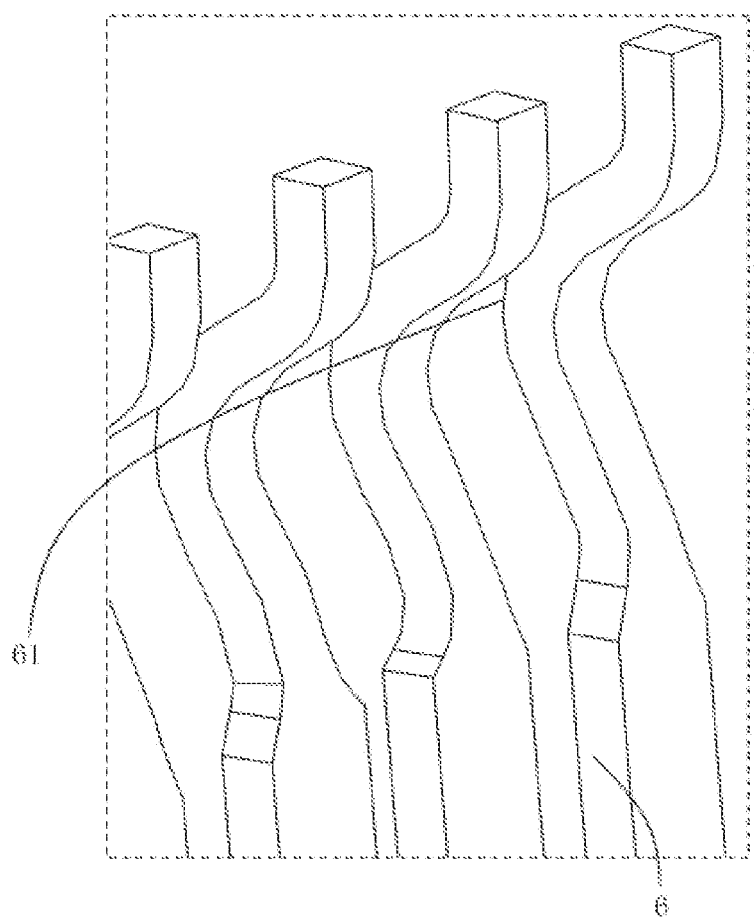
FIG. 6 is an enlarged view of a portion A in FIG. 5.
Figure 7:
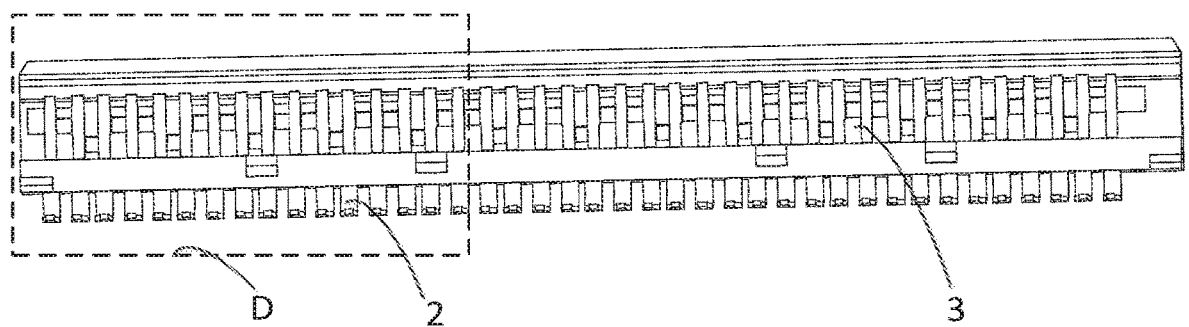
FIG. 7 is a front view of a plug assembly of an electrical connector.
Figure 8:
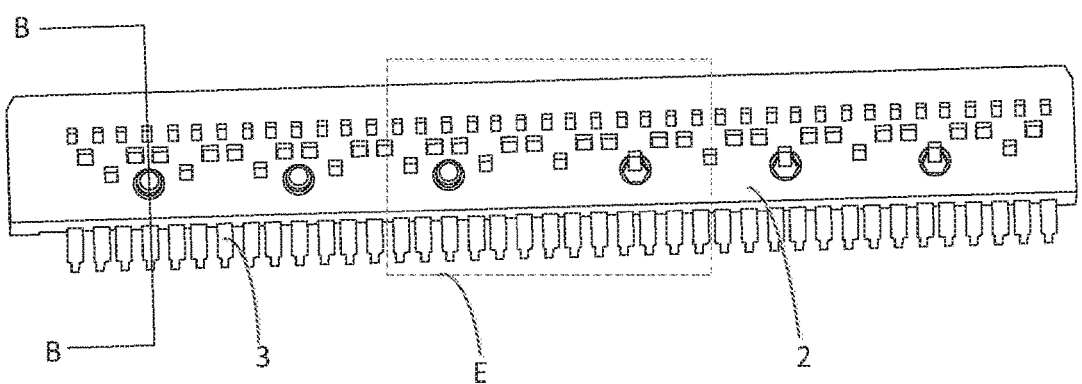
FIG. 8 is a rear view of the plug assembly of FIG. 7.

The mating connector 200, as shown in FIGS. 3-6, includes a mating housing 5 made of an insulating material, in which a mating receiving chamber 51 is formed, a pair of mating insulating main bodies 8 made of insulating material mounted in the mating receiving chamber 51, and a pair of rows of mating terminals 6 mounted on the two mating insulating main bodies 8. Mating ends 61 of the rows of mating terminals 6 protrude from the mating insulating main bodies 8. The mating ends 61 are formed in arc shapes protruding towards each other to make smooth electrical contact with conductive terminals 3 of the electrical connector 100. As shown in FIG. 5, a row of mating terminals 6 and a mating insulating main body 8 assembled together is referred to as a receptacle assembly 20.

As shown in FIGS. 1, 2, and 7-12, a plug assembly 10 includes an insulating main body 2 and a plurality of conductive terminals 3. The insulating main body 2 includes a mating portion 21 adapted to mate with a receptacle assembly 20. The plurality of conductive terminals 3 are secured to the insulating main body 2 by a molding process. Each of the conductive terminals 3 includes a contact portion 31 adapted to make electrical contact with a mating terminal 6 of the receptacle assembly 20. A contact surface 312 of the contact portion 31 is exposed from a sidewall of the mating portion 21. The insulating main body 2 has a plurality of supporting through holes 23, and each of the supporting through holes 23 is configured to vertically extend to a rear surface 313 of one of the conductive terminals 3 opposite to the contact surface 312 from the rear side 212 of the insulating main body 2.

Figure 15:
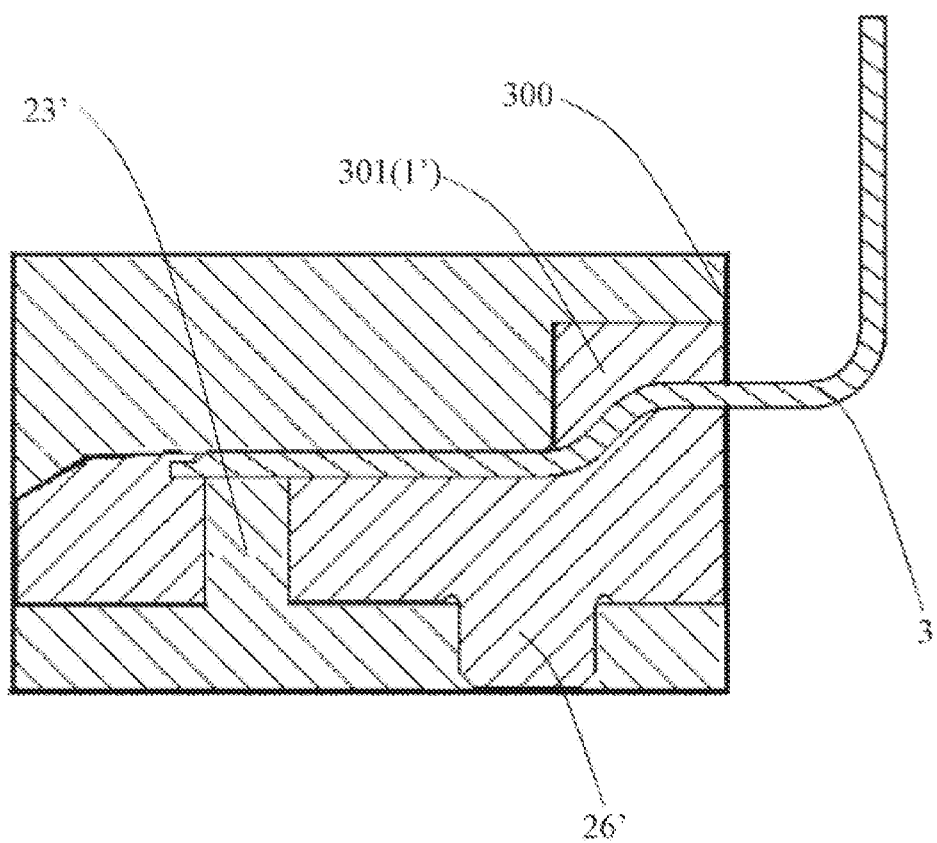
FIG. 15 is a sectional side view of a plug assembly according to an embodiment made by an injection molding process.

A method for manufacturing a plug assembly 10, as shown in FIG. 15, includes steps of: fixing a row of conductive terminals 3 in a molding cavity 301 of a mold 300, injecting colloid 1' in a molten state into the molding cavity 301, solidifying the colloid so that the conductive terminals 3 are fixed on the insulating main body 2 formed by the solidified colloid, and taking the insulating main body 2 and the conductive terminals 3 out of the mold 300. The molding cavity 301 has a same shape as the insulating main body 2 to be formed. A plurality of support pillars 23' are provided in the molding cavity 301 and supported at a lower part of the contact portions 31 of the conductive terminals 3. A plurality of supporting through holes 23 are formed on the insulating main body 2 in the molding process by the support pillars 23'.

The plurality of conductive terminals 3 of the plug assembly 10 are fixed on the insulating main body 2 by the molding process. The contact portions 31 of the conductive terminals 3 may be stably held in place by the support pillars 23' during the injection molding process, for example, such that the contact surfaces 312 of the contact portions 31 of the conductive terminals 3 are slightly higher than the outer surface of the insulating main body 2 to be formed. In this way, the plurality of supporting through holes 23 are formed on the finished insulating main body 2.

Figure 9:
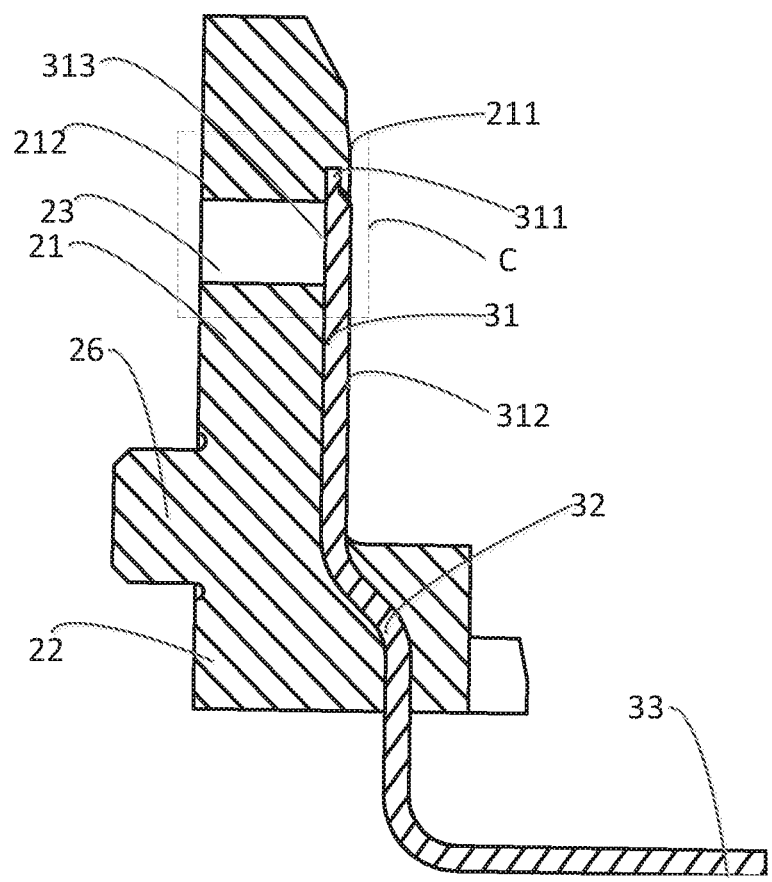
FIG. 9 is a sectional side view of the plug assembly taken along line B-B of FIG. 8.
Figure 10:
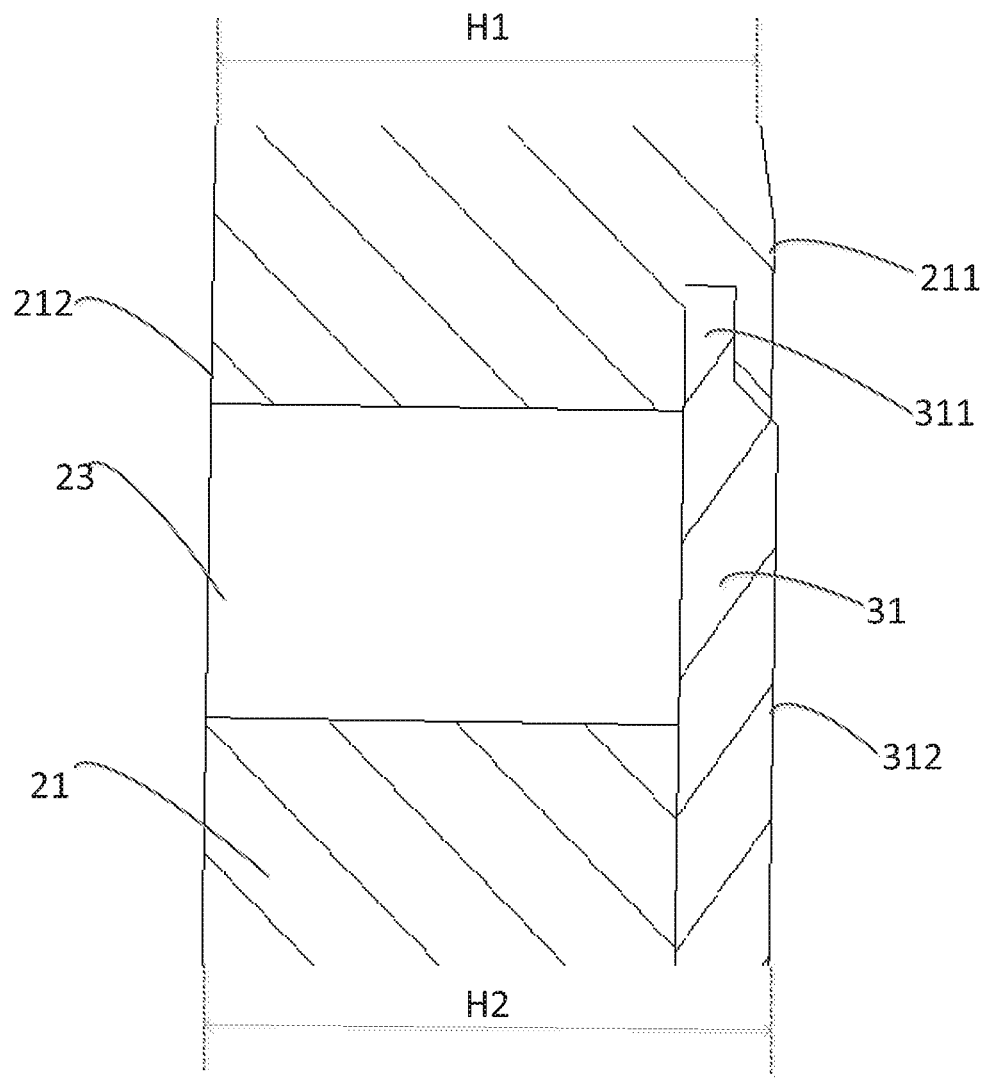
FIG. 10 is an enlarged view of a portion C of FIG. 9.

As shown in FIGS. 9 and 10, the free end 311 of the contact portion 31 of each of the conductive terminals 3 is inserted into the insulating main body 2. A thickness of the free end 311 of the contact portion 31 is less than a thickness of the contact portion 31, and the free end 311 of the contact portion 31 is inserted into the insulating main body 2. In another embodiment, the free end 311 of the contact portion 31 is bent and inserted into the insulating main body 2. In this way, during the process of engaging the electrical connector 100 with the mating connector 200, the mating ends 61 of the mating terminals 6 of the mating connector 200 may smoothly slide relative to the contact portions 31 of the conductive terminals 3, and thus the free ends 311 of the conductive terminals 3 are prevented from generating burrs or being curled up.

In the embodiment shown in FIG. 10, the contact surface 312 of the conductive terminal 3 protrudes from the front side 211 of the insulating main body 2. A distance H1 from the rear side 212 to the front side 211 (i.e., the thickness) of the mating portion 21 of the insulating main body 2 is less than a distance H2 from the rear side 212 of the mating portion 21 of the insulating main body 2 to the contact surface 312 of the conductive terminal 3. In this way, it can be ensured that the mating ends 61 of the mating terminals 6 of the mating connector 200 reliably electrically contact with the contact portions 31 of the conductive terminals 3 of the electrical connector 100.

As shown in FIGS. 7, 8, 11 and 12, the conductive terminals 3 include a plurality of signal terminals 34 and a plurality of ground terminals 35. A pair of signal terminals 34 are provided between adjacent ground terminals 35. Two signal terminals 34 located between adjacent ground terminals 35 may be used as a pair of differential signal terminals to transmit data signals. Each pair of differential signal terminals is separated from another adjacent pair of differential signal terminals by a ground terminal 35.

Figure 11:
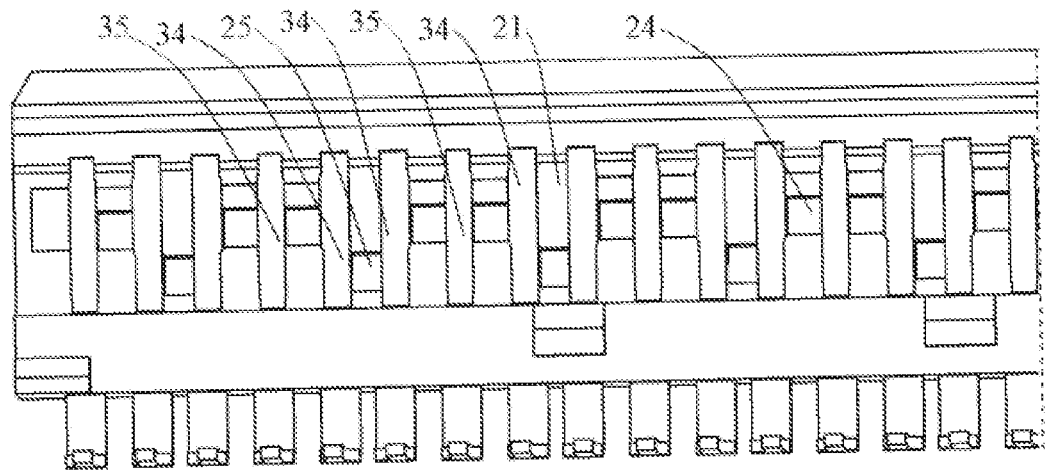
FIG. 11 is an enlarged view of a portion D of FIG. 7.
Figure 12:
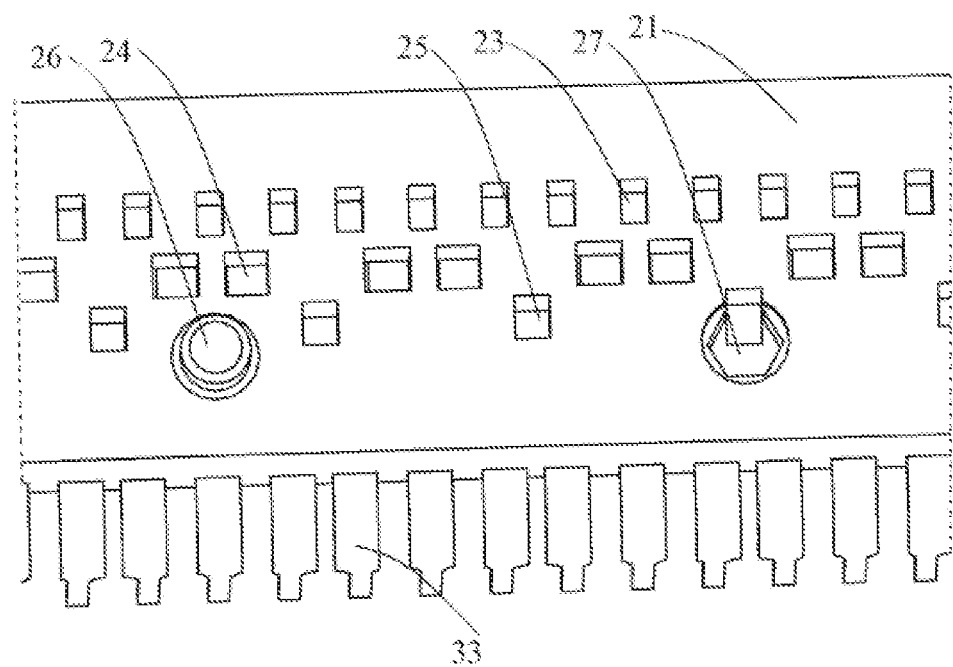
FIG. 12 is an enlarged view of a portion E of FIG. 8.

As shown in FIGS. 11 and 12, a first through hole 24 passing through the thickness of the mating portion 21 is provided between the ground terminal 35 and the signal terminal 34 in the vicinity of the contact portion 31 of each of the conductive terminals 3. A resin material forming the insulating main body 2 is not provided at the position of the first through hole 24. Thus, the signal crosstalk between the ground terminals 35 and the signal terminals 34 may be reduced in the vicinity of the contact portion 31 of each of the conductive terminals 3, and signal integrity (SI) between the ground terminals 35 and the signal terminals 34 may be improved.

As shown in FIGS. 11 and 12, in an embodiment, a second through hole 25 passing through the thickness of the mating portion 21 is provided between the two signal terminals 34 between two ground terminals 35 in the vicinity of the contact portion 31 of each of the conductive terminals 3. The second through holes 25 are offset from the first through holes 24 in the length direction of the conductive terminals 31, and the second through holes 25 are farther away from the free ends 311 of the contact portions 31 than the first through holes 24. Thus, the signal crosstalk between the two signal terminals 34 may be reduced in the vicinity of the contact portion 31 of each of the conductive terminals 3 and the signal integrity between the signal terminals 34 may be improved.

As shown in FIGS. 1, 2, 9, and 12, at least one engaging protrusion 26 and at least one engaging groove 27 are formed on the rear side of the insulating main body 2 of the plug assembly 10. The engaging protrusion 26 and the engaging groove 27 are configured to be combined with an engaging groove 27 and an engaging protrusion 26 of another plug assembly 10 respectively to assemble the plug assembly 10 with the another plug assembly 10 back to back. The engaging protrusion 26 of a first plug assembly 10 and the engaging groove 27 of a second plug assembly 10 may be assembled together in a snap-fit manner. Adhesive may be applied to the engaging protrusion 26 so as to achieve a firm engagement between the engaging protrusion 26 and the engaging groove 27.

As shown in FIGS. 3, 4, and 12, at least one engaging protrusion 81 and at least one engaging groove 82 are formed on the rear side of the mating insulating main body 8 of the mating connector 200. The engaging protrusion 81 and the engaging groove 82 are combined with an engaging groove 82 and an engaging protrusion 81 of another receptacle assembly 20 to assemble the mating insulating main body 8 with another mating insulating main body 8 back to back.

The connector assembly according to the embodiments of the disclosure may be applied to high-speed data transmission, and meets the requirements of molding process manufacturing and high-speed transmission of 32 Gbps. Eighty or more conductive terminals 3 are arranged in two rows so as to reduce the size of the entire electrical connector. By adopting the method for manufacturing the plug assembly 10, more conductive terminals 3 may be accurately fixed on the insulating main body 2, and the integrity of transmitted signals may be ensured.

As shown in FIGS. 1, 2, and 9, the insulating main body 2 further includes a mounting portion 22 integrally connected with the mating portion 21. Each of the conductive terminals 3 includes a fixing portion 32 fixed in the mounting portion 22 and a welding portion 33 welded to an electrical contact of a circuit board.

The electrical connector 100, as shown in FIGS. 1 and 2, includes mounting components 4 engaged into mounting grooves 12 formed at both ends of the housing 1 to mechanically mount the housing 1 to a circuit board via the mounting components 4.

As shown in the embodiments of FIGS. 3 and 4, the mating connector 200 includes mating mounting components 7 engaged into mating mounting grooves formed at both ends of the mating housing 5 to mechanically mount the mating housing 5 to a mating circuit board. In this way, electrical connection between the circuit board and the mating circuit board is achieved in a state where the electrical connector 100 mates with the mating connector 200, thereby achieving board-to-board communication.

Figure 14:
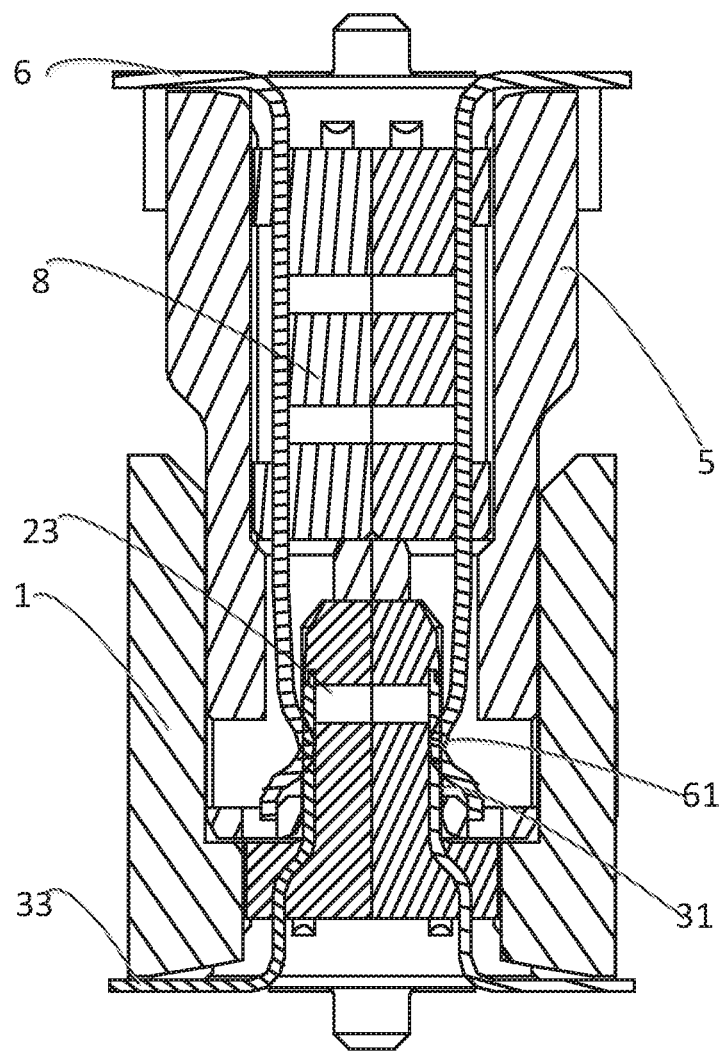
FIG. 14 is a sectional side view of the connector assembly of FIG. 13.

As shown in FIG. 14, in a state where the electrical connector 100 mates with the mating connector 200, the mating housing 5 of the mating connector 200 is partially inserted into the receiving chamber 11 of the housing 1 of the electrical connector 100, and the plug assembly 10 of the electrical connector 100 is partially inserted between the mating ends 61 of the two rows of the mating terminals 6 protruding from the mating insulating main body 8, so that the mating ends 61 are in electrical contact with the contact portions 31 of the conductive terminals 3, thereby achieving electrical connection between the electrical connector 100 and the mating connector 200.

In an embodiment shown in FIGS. 11-13, first pillars are provided in the molding cavity 301 of the mold 300 in the vicinity of the contact portions 31 of the conductive terminals 3 and between the ground terminals 35 and the signal terminals 34. In this way, the first through holes 24 are formed in the process of injecting the colloid 1' in molten state into the molding cavity 301.

In an embodiment shown in FIGS. 11-13, second pillars are provided in the molding cavity 301 of the mold 300 in the vicinity of the contact portions 31 of the conductive terminals 3 and between the two signal terminals 34 between two ground terminals 35 to form second through holes 25 in the process of injecting the colloid 1' in molten state into the molding cavity 301. The second through holes 25 are offset from the first through holes 24 in the length direction of the conductive terminals 3, and the second through holes 25 are farther away from the free ends 311 of the contact portions 31 than the first through holes 24.

Those skilled in the art will appreciate that the above-described embodiments are illustrative and can be modified, and that the structures described in the various embodiments can be freely combined without conflict in structure or principle. Although the present disclosure has been described with reference to the accompanying drawings, the embodiments disclosed in the drawings are intended to be illustrative explanation of the embodiments of the present disclosure, and should not be construed as limiting the present disclosure.

Although a few embodiments of the present general inventive concept have been shown and described, it would be appreciated by those skilled in the art that changes may be made in these embodiments without departing from the principles and spirit of the present general inventive concept, and the scope of the present disclosure is defined by the claims and their equivalents.

What is claimed is:

1. A plug assembly, comprising:
an insulating main body having a mating portion adapted to mate with a receptacle assembly and a plurality of supporting through holes arranged in the mating portion; and
a plurality of conductive terminals secured to the insulating main body by molding, each of the conductive terminals having a contact portion with a contact surface, the contact surface is exposed from a sidewall of the mating portion, each of the supporting through holes extends to an underside surface of one of the conductive terminals opposite to the contact surface from an underside of the insulating main body.

2. The plug assembly of claim 1, wherein the contact portion has a free end inserted into the insulating main body.

3. The plug assembly of claim 2, wherein a thickness of the free end of the contact portion is less than a thickness of the contact portion.

4. The plug assembly of claim 1, wherein the contact surface protrudes from a front side of the insulating main body.

5. The plug assembly of claim 1, wherein the conductive terminals include a plurality of signal terminals and a plurality of ground terminals, a pair of signal terminals are disposed between adjacent ground terminals.

6. The plug assembly of claim 5, wherein a first through hole extending through a thickness of the mating portion is provided between one of the ground terminals and one of the signal terminals in the vicinity of the contact portion of each of the conductive terminals.

7. The plug assembly of claim 6, wherein a second through hole extending through the thickness of the mating portion is provided between the pair of signal terminals in the vicinity of the contact portion of each of the conductive terminals.

8. The plug assembly of claim 7, wherein the second through hole is offset from the first through hole in a length direction of the conductive terminals, the second through hole is further from a free end of the contact portions than the first through hole.

9. The plug assembly of claim 1, wherein the insulating main body has a mounting portion integrally connected with the mating portion, each of the conductive terminals has a fixing portion fixed in the mounting portion and a welded portion welded to an electrical contact of a circuit board.

10. The plug assembly of claim 1, wherein the rear side of the insulating main body has an engaging protrusion and an engaging groove, the engaging protrusion and the engaging groove engage with an engaging groove and an engaging protrusion of another plug assembly to assemble the plug assembly and the another plug assembly together.

11. The plug assembly of claim 1, wherein:
each of the supporting through holes is positioned opposite an area of contact between one of the conductive terminals and a corresponding mating terminal; and
a sidewall of the insulating main body defining each of the supporting through holes extends up to the underside surface of each of the corresponding conductive terminals opposite the contact surface.

12. An electrical connector, comprising:
a housing having a receiving chamber; and a pair of plug assemblies each including an insulating main body and a plurality of conductive terminals, including a plurality of signal terminals disposed between adjacent ground terminals, secured to the insulating main body by molding, the insulating main body has a mating portion adapted to mate with a receptacle assembly and a plurality of supporting through holes arranged in the mating portion, each of the conductive terminals has a contact portion with a contact surface, the contact surface is exposed from a sidewall of the mating portion, each of the supporting through holes extends to an underside surface of one of the conductive terminals opposite to the contact surface from an underside of the insulating main body with a first through hole extending through a thickness of the mating portion between one of the ground terminals and one of the signal terminals in the vicinity of the contact portion of each of the conductive terminals, the pair of plug assemblies are assembled together and mounted in the receiving chamber.

13. The electrical connector of claim 12, further comprising a plurality of mounting components engaging a plurality of mounting grooves formed at opposite ends of the housing to mount the housing onto a circuit board.

14. A connector assembly, comprising:
an electrical connector including a housing having a receiving chamber and a pair of plug assemblies each including an insulating main body and a plurality of conductive terminals secured to the insulating main body by molding, the insulating main body has a mating portion adapted to mate with a receptacle assembly and a plurality of supporting through holes, each of the conductive terminals has a contact portion with a contact surface, the contact surface is exposed from a sidewall of the mating portion, each of the supporting through holes extends to an underside surface of one of the conductive terminals opposite to the contact surface from an underside of the insulating main body, the pair of plug assemblies are assembled together and mounted in the receiving chamber; and
a mating connector mating with the electrical connector, the mating connector including mating terminals contacting the contact portions of the conductive terminals directly opposite the supporting through holes.

15. The connector assembly of claim 14, wherein the mating connector includes a mating housing in which a mating receiving chamber is formed, a pair of mating insulating main bodies mounted in the mating receiving chamber, and a pair of rows of mating terminals mounted on the mating insulating main bodies, a plurality of mating ends of the rows of mating terminals protrude from the mating insulating main bodies.

16. The connector assembly of claim 15, wherein the mating housing is partially inserted into the receiving chamber of the housing and the plug assemblies of the electrical connector are partially inserted between the mating ends of the rows of mating terminals protruding from the mating insulating main bodies, the mating ends electrically contact the contact portions of the conductive terminals.

17. The connector assembly of claim 16, wherein the mating connector includes a plurality of mating mounting components engaging a plurality of mating mounting grooves formed at opposite ends of the mating housing to mount the mating housing onto a mating circuit board.

18. A method for manufacturing a plug assembly, comprising:
fixing a row of conductive terminals, including a plurality of signal terminals disposed between adjacent ground terminals, in a molding cavity of a mold, the molding cavity has a same shape as an insulating main body to be formed, a plurality of support pillars in the molding cavity support a lower part of a contact portion of each of the conductive terminals;
injecting a colloid in a molten state into the molding cavity;
solidifying the colloid and fixing the conductive terminals on the insulating main body formed by the solidified colloid; and
taking the insulating main body and the conductive terminals out of the mold, which forms a plurality of supporting through holes on the insulating main body at a plurality of positions of the support pillars, first through holes extending through a thickness of a mating portion of the insulating main body are formed between the ground terminals and the signal terminals in the vicinity of the contact portions of each of the conductive terminals.

19. The method of claim 12, wherein a plurality of first pillars are provided in the molding cavity in a vicinity of the contact portions of the conductive terminals and between the ground terminals and the signal terminals to form the first through holes in the process of injecting colloid in the molten state into the molding cavity.

20. The method of claim 19, wherein a plurality of second pillars are provided in the molding cavity in the vicinity of the contact portions and between the pair of signal terminals to form second through holes in the process of injecting colloid in the molten state into the molding cavity, the second through holes are offset from the first through holes in a length direction of the conductive terminals, the second through holes are further from a free end of the contact portions than the first through holes.

\* \* \* \* \*